United States Patent
Jenkins

(10) Patent No.: US 8,714,533 B2
(45) Date of Patent: May 6, 2014

(54) CLAY MODEL SUPPORT DEVICE

(75) Inventor: Mark Jenkins, Westminster, CA (US)

(73) Assignee: Honda Motor Co., Ltd., Tokyo (JP)

( * ) Notice: Subject to any disclaimer, the term of this patent is extended or adjusted under 35 U.S.C. 154(b) by 491 days.

(21) Appl. No.: 13/035,439

(22) Filed: Feb. 25, 2011

(65) Prior Publication Data

US 2012/0217690 A1   Aug. 30, 2012

(51) Int. Cl.
  *B23Q 1/00* (2006.01)
  *B25B 1/00* (2006.01)
  *B66F 3/00* (2006.01)

(52) U.S. Cl.
  USPC .................. 269/54.5; 254/134; 269/3; 269/6

(58) Field of Classification Search
  USPC .............. 269/3, 6, 45, 32, 17; 254/134;
      414/684.3, 697, 758, 783, 10, 11, 12,
      414/629, 628, 634, 635, 672; 108/6–8, 137,
      108/143
  See application file for complete search history.

(56) References Cited

U.S. PATENT DOCUMENTS

| | | | |
|---|---|---|---|
| 2,771,706 A | 11/1956 | Johnson | |
| 2,828,870 A * | 4/1958 | Corley | 414/11 |
| 3,006,107 A | 10/1961 | Tolegian | |
| 3,543,282 A | 11/1970 | Sautereau | |
| 4,239,196 A * | 12/1980 | Hanger | 269/17 |
| 4,726,555 A | 2/1988 | Andrews | |
| 5,074,513 A | 12/1991 | Presley et al. | |
| 5,242,145 A | 9/1993 | Linnell | |
| 5,738,483 A | 4/1998 | Terpstra | |
| 6,324,750 B1 | 12/2001 | Saunders et al. | |
| 6,748,873 B2 * | 6/2004 | Brown, Sr. | 108/6 |

FOREIGN PATENT DOCUMENTS

| | | |
|---|---|---|
| JP | 09328299 | 12/1997 |
| JP | 10277967 | 10/1998 |

* cited by examiner

*Primary Examiner* — Lee D Wilson
*Assistant Examiner* — Nirvana Deonauth
(74) *Attorney, Agent, or Firm* — Rankin, Hill & Clark LLP

(57) ABSTRACT

A clay model support device includes a base, a support frame connected with the base, and a panel connected with the support frame. The base includes a lower surface configured to engage an associated horizontal floor surface. The support frame is pivotable with respect to the base about a generally horizontal axis. The panel is configured to support an associated clay model. The panel is slidable with respect to the support frame.

18 Claims, 13 Drawing Sheets

CLAY MODEL SUPPORT DEVICE

BACKGROUND

The automotive clay modeling process requires accurate measuring during and at the completion of the sculpting process. Known clay armatures, which are configured to support a clay model of an automobile part, are welded steel or aluminum frames that are sent through a machine process to square the frame. These known armatures are too low to the ground and require the sculptor to sit on the ground or contort into non-ergonomic positions when the sculptor is sculpting the clay model. These known clay armatures are also not adjustable, thus requiring heavy lifting.

Other known devices for supporting clay models include adjustable tables raised and lowered by a hydraulically powered lift mechanism, such as a scissors-type linkage. Adjustable artist's easels are also known. However, artist's easels are not designed to support the weight of a clay model of an automobile part.

SUMMARY

An example of a clay model support device that can overcome the aforementioned shortcomings includes a base, a support frame connected with the base, and a panel connected with the support frame. The base includes a lower surface configured to engage an associated horizontal floor surface. The support frame is pivotable with respect to the base about a generally horizontal axis. The panel is slideable with respect to the support frame.

Another example of a clay model support device that can overcome the aforementioned shortcomings includes a base and a panel connected with the base. The base is configured to selectively engage an associated horizontal floor surface. The panel connects with the base in a manner to allow for translational movement of the panel with respect to the base and to allow for rotational movement of the panel with respect to the base about a generally horizontal axis. The panel is configured to support an associated clay model in a generally vertical orientation while providing an operator access to the lower surface of the associated clay model.

DETAILED DESCRIPTION

Figure 1:
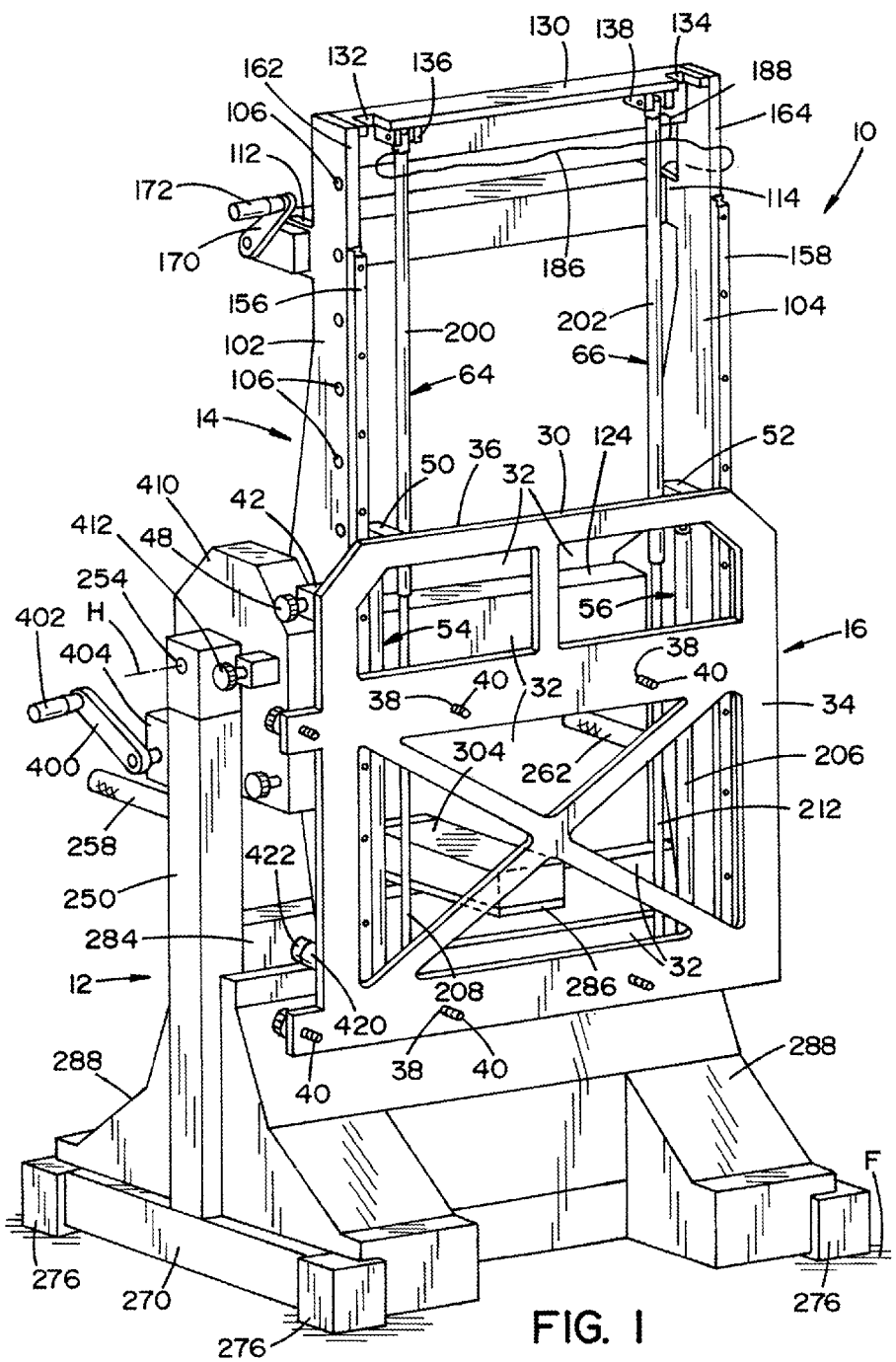
FIG. 1 is a front perspective view of a clay model support device.

With reference to FIG. 1, a clay model support device 10 includes a base 12, a support frame 14 connected with the base, and a panel 16 connected with the support frame. The clay model support device 10 is generally configured to support a clay work piece C, such as a clay model of a car door shown in FIG. 2. The clay model support device 10 allows the artist and other operators to manipulate the clay work piece and to sculpt surfaces of the clay work piece that were previously sculpted by bending over or laying on the ground.

The clay model support device 10 in the illustrated embodiment includes a panel actuator assembly for driving the panel 16 with respect to the support frame 14. In the illustrated embodiment, the panel 16 is connected with the support frame 14 such that the panel is slidable with respect to the support frame. The clay model support device 10 also includes a support frame actuator assembly connected with the base 12 and the support frame 14. The support frame actuator assembly is configured to drive the support frame 14 to pivot the support frame with respect to the base 12. Accordingly, the panel 16 is connected with the base 12 for translational movement of the panel and rotational movement of the panel about a generally horizontal axis H as described in more detail below. In the depicted embodiment, the horizontal rotational axis H for support frame 14 is located at least about 800 mm vertically above a lower surface of the base 12. This allows a sculptor to work with the clay model without having to bend over nearly as much as compared to some known clay model support devices.

With continued reference to FIG. 1, the panel 16 includes a panel body 30 having a plurality of voids 32. In the illustrated embodiment, the panel body 30 can be made from a light rigid material, such as aluminum. The panel body 30 can be made from other rigid materials. The panel body 30 defines a panel mounting surface 34, which in the depicted embodiment is generally planar. The panel body 30 also defines a rear surface 36, which is opposite the panel mounting surface 34. In the illustrated embodiment, the rear surface 36 is also generally planar and parallel to the panel mounting surface. The panel body 30 also includes a plurality of clay model support pin openings 38 each configured to receive a respective clay model support pin 40. The clay model support pins 40 extend from the panel mounting surface 34 and are configured to engage an associated frame FR to which an associated clay model C is attached (see FIG. 2). The frame FR abuts the panel mounting surface 34 when mounted to the clay model support device 10. In the illustrated embodiment, the panel 16 and the clay model frame support pins 40, in aggregate, are configured to support a clay model C having a mass of at least about 40 kg. Instead of the clay model frame support pins 40 depicted in FIG. 1, the clay model support device 10 could also include supports having another configuration (e.g., hooks or flanges configured to engage the frame FR associated with clay model C). Additionally, the supports extending from the panel mounting surface 34 of the panel 16 can be configured so that the supports, in aggregate, can support a clay model having a mass of at least about 55 kg.

Figure 8:
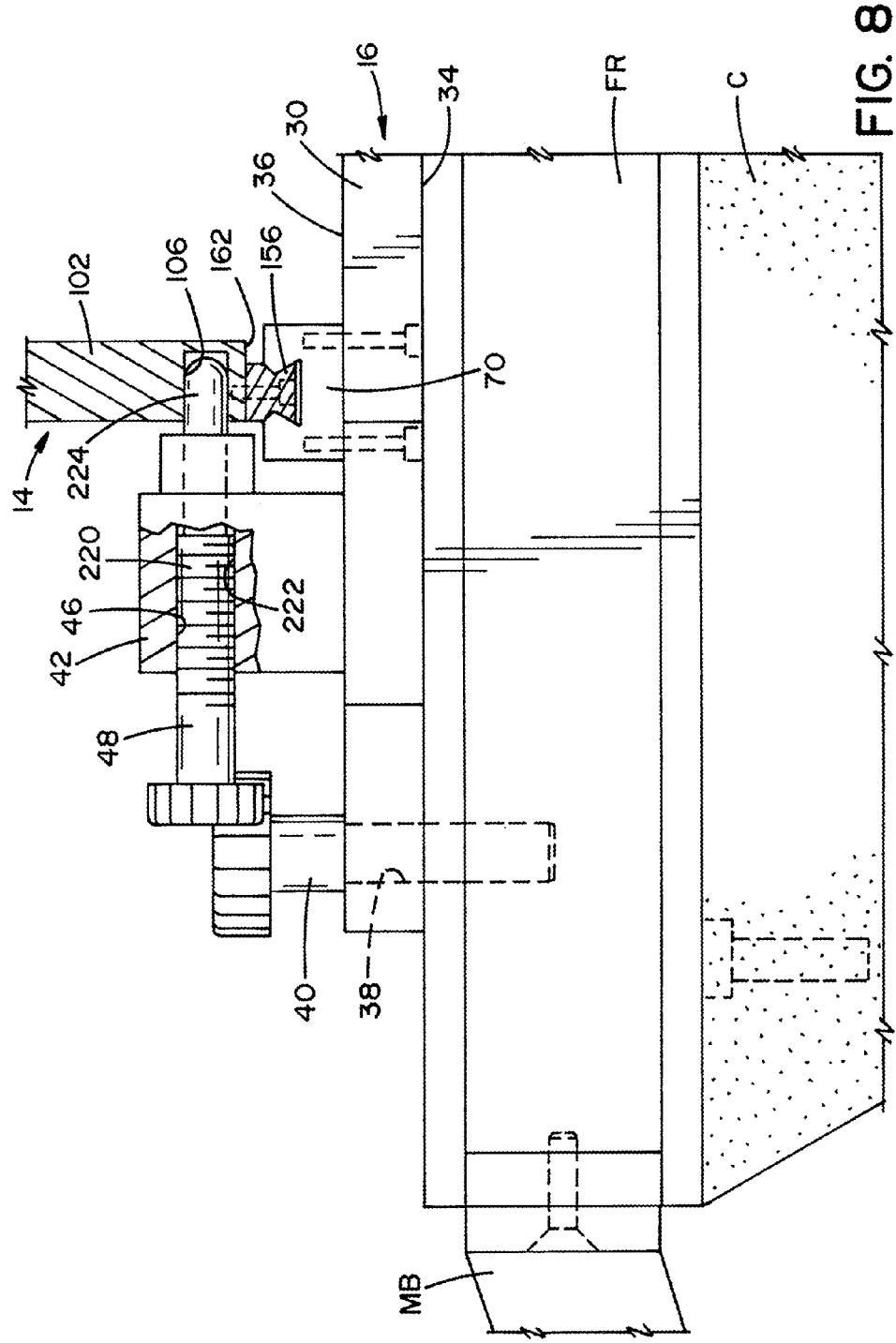
FIG. 8 is a cross-sectional view taken along line 8-8 in FIG. 2.

The clay model support device 10 also includes panel locking pin extensions that extend rearwardly from the rear surface 36 of the panel body 30. As more clearly seen in FIG. 3, two extensions (e.g., a left panel locking pin extension 42 and a right panel locking pin extension 44) are depicted on opposite lateral sides of the panel body 30. However, a fewer or greater number of extensions can be provided. Throughout the description, the terms "left" and "right" will be used simply for ease of locating components in the figures with respect to a "front" side of the device, which is the side to which the clay model C mounts. These terms are not meant to limit the location of the component to which the term refers. With reference to FIG. 8, each extension can include a panel locking pin bore 46, which in the depicted embodiment is stepped and includes a threaded section and an unthreaded section. Although the right panel locking pin extension 44 is not visible in FIG. 8, it should be understood that the right panel locking pin extension has the same configuration as the left panel locking pin extension 42. A panel locking pin 48 is threadably received in the panel locking pin bore 46 and engages the support frame 14 in a manner that will be described in more detail below.

The clay model support device 10 also includes an upper bracket that extends from the rear surface 36 of the panel body 30. In the depicted embodiment, two upper brackets (e.g., a right upper bracket 50 and a left upper bracket 52) extend from the rear surface 36 of the panel body 30. However, a fewer or greater number of brackets can extend from the rear surface. In the depicted embodiment, the upper brackets 50, 52 each extend rearwardly from an uppermost edge of the panel body 30. Each upper bracket 50, 52 connects with a respective outer hydraulic cylinder and rod assembly 54, 56 that makes up a portion of the panel actuator assembly to allow the panel 16 to translate (e.g., slide or move linearly with respect to the support frame 14).

Figure 7:
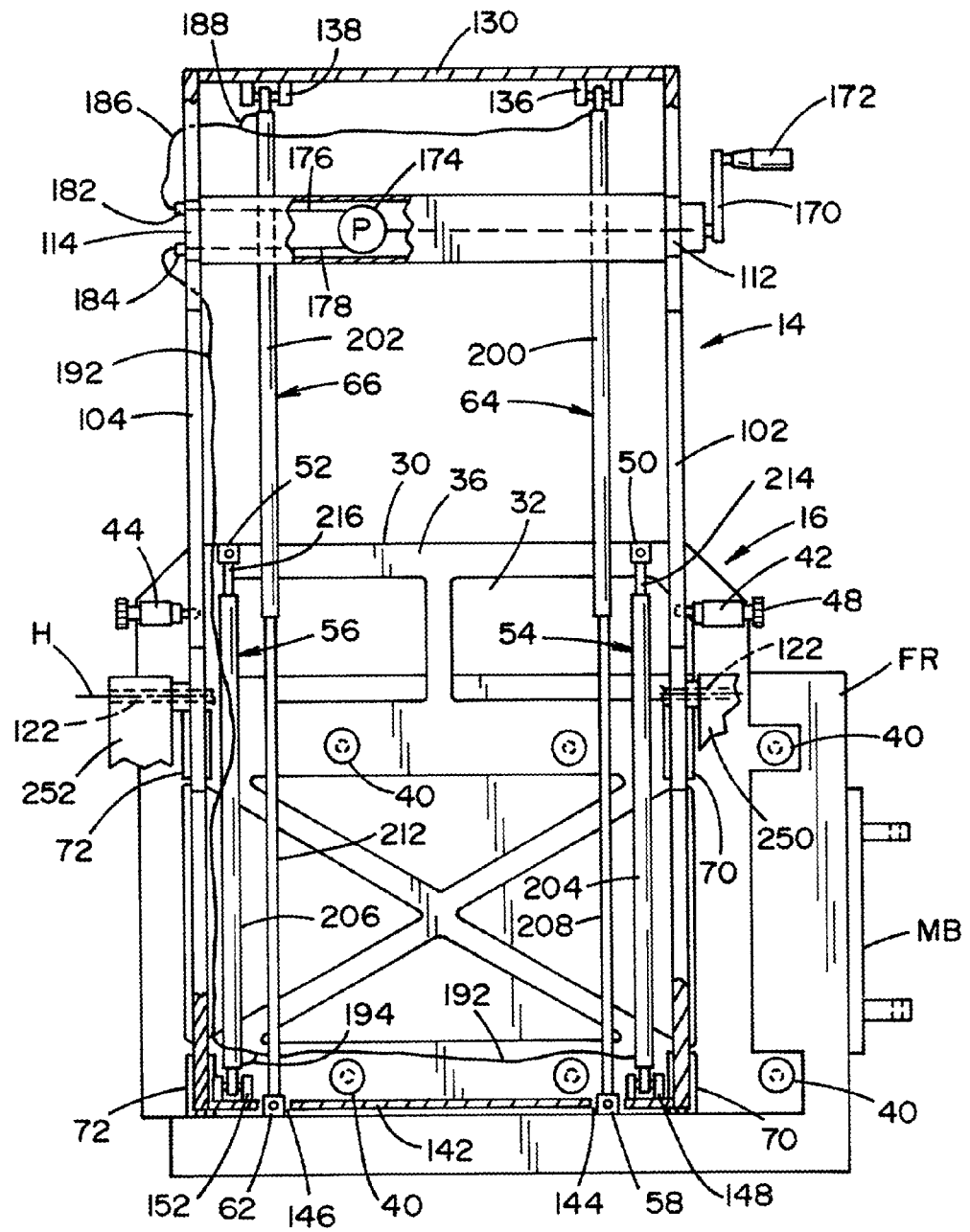
FIG. 7 is a cross-sectional view taken along line 7-7 of FIG. 6.

With reference to FIG. 7, the clay model support device 10 also includes a lower bracket that extends rearwardly from the rear surface 36 of the panel body 30. In the illustrated embodiment, two lower brackets (e.g., a left lower bracket 58 and a right lower bracket 62) are provided. However, a greater or fewer number of lower brackets could be provided. In the illustrated embodiment, each lower bracket 58, 62 extends from the rear surface 36 of the panel body 30 adjacent the lowermost edge of the panel body. Each lower bracket 58, 62 connects with a respective inner hydraulic cylinder and rod assembly 64, 66 that makes up a portion of the panel actuator assembly to allow the panel body 30 to slide with respect to the support frame 14. Throughout the description, the terms "inner" and "outer" will be used simply for ease of locating components in the figures with respect to lateral sides of the device. These terms are not meant to limit the location of the component to which the term refers.

The clay model support device 10 also includes extension guides that extend rearwardly from the rear surface 36 of the panel body 30. In the illustrated embodiment and as more clearly seen in FIG. 3, two extension guides (e.g., a left extension guide 70 and a right extension guide 72) are depicted adjacent opposite lateral sides of the panel body 30. However, a fewer or greater number of extensions can be provided. With reference to FIG. 8, each extension guide has a dovetail configuration in cross section. Although the right extension guide 72 is not visible in FIG. 8, it should be understood that the right extension guide has the same configuration as the left extension guide 70. The extension guides 70, 72 cooperate with the support frame 14 in a manner that will be described in more detail below.

Referring again to FIG. 1, the support frame 14 connects with the base 12 such that the support frame 14 is pivotable with respect to the base 12 about a horizontal axis H. In the illustrated embodiment, the support frame 14 includes a first rail (hereinafter referred to as the left rail) 102 and a second rail (hereinafter referred to as the right rail) 104. Each rail 102, 104 is elongated in an axis generally perpendicular to the horizontal axis H about which the support frame 14 pivots. The rails 102, 104 in the illustrated embodiment can be made from a rigid material, such as aluminum. The rails could be made from another rigid material. The left rail 102 is spaced from the right rail 104 in a direction generally parallel with the horizontal axis H slightly less than the width of the panel body 30 (measured along the same axis). Each rail 102, 104 includes a plurality of panel locking pin apertures 106 spaced along an axis parallel with the longest dimension of the rail. Although the panel locking pin apertures 106 in the right rail 104 are not visible in FIG. 1, it should be understood that apertures are included in both rails 102, 104. The panel locking pin apertures cooperate with the panel locking pins 48 in a manner that will be described in more detail below.

In the illustrated embodiment, each rail 102 and 104 includes a respective rearwardly extending flange 112, 114. The flanges 112, 114 provide a location for mounting components of the panel actuator assembly (described below). Each rail 102, 104 also includes a central rearwardly extending flange 116, 118, respectively. As seen in FIG. 7, an axle 122 extends through each flange 116, 118 to allow the support frame 14 to pivot with respect to the base 12. Two coaxial axles could also be provided. An axle housing 124 extends from the left flange 116 to the right flange 118 to cover the axle 122, which is concentric with the horizontal axis H.

Referring again to FIG. 1, the clay model support device 10 includes a first cross member (hereinafter the upper cross member) 130 that spans between the left rail 102 and the right rail 104 and connects to each rail. Throughout the description, the terms "upper" and "lower" will be used simply for ease of locating components in the figures with respect to the orientation shown in FIG. 1. These terms are not meant to limit the location of the component to which the term refers. In the depicted embodiment, the upper cross member 130 is generally L-shaped. The upper cross member 130 includes a notch that is aligned to cooperate with the upper brackets 50, 52 that extend from the rear surface 36 of the panel body 30. In the illustrated embodiment, the upper cross member 130 includes a first notch (hereinafter a left notch) 132 that can receive the left upper bracket 52 and a second notch (hereinafter a right notch) 134 that can receive the right upper bracket 50.

With continued reference to the embodiment illustrated in FIG. 1, the clay model support device 10 also includes brackets connected with the upper cross member 130. In the illustrated embodiment, a first bracket (hereafter left upper bracket) 136, extends downwardly from the upper cross member 130 and a second bracket (hereinafter right upper bracket) 138 also extends downwardly from the upper cross member 130. The brackets 136, 138 connect with a respective inner hydraulic cylinder and rod assembly 64, 66 to allow for translational (e.g., linear) movement of the panel 16 with respect to the support frame 14, which will be described in more detail below.

With reference to FIG. 7, the clay model support device 10 also includes a second cross member (hereinafter lower cross member) 142 that spans from the left side rail 102 to the right side rail 104 and connects with each rail. The lower cross member 142 also includes a notch that is aligned with the lower brackets 58, 62 that extends from the rear surface 36 of the panel body 30. In the illustrated embodiment, the lower cross member 142 includes a first notch (hereinafter a left notch) 144 that can receive the left lower bracket 58 and a second notch (hereinafter a right notch) 146 that can receive the right lower bracket 62.

In the illustrated embodiment and with continued reference to FIG. 7, a first lower bracket (hereinafter a left lower bracket) 148 connects with and extends from the lower cross member 142 and a second bracket (hereinafter a right lower bracket) 152 also extends from the lower cross member 142. The left lower bracket 148 connects with the left outer hydraulic cylinder and rod assembly 54 and the right lower bracket 152 connects with the right outer hydraulic cylinder and rod assembly 56. The location of the hydraulic cylinder and rod assemblies with respect to one another can be altered, if desired.

With reference back to FIG. 1, the clay model support device 10 also includes guides 156, 158 connected with the rails 102, 104, respectively. Each guide 156, 158 is connected with a respective rail 102, 104 and disposed between the respective rail and the panel 16. The guides 156, 158 are mounted (e.g., fastened or in any other conventional manner) to a forward (per the orientation in FIG. 1) surface 162, 164 of each rail 102, 104 respectively. The guides 156, 158 in the depicted embodiment can be made from a material that is less rigid than the rails 102, 104, but rigid enough to not permanently deform if the panel 16 and the accompanying clay model C (FIG. 2) were to press the guides against the rails. Accordingly, the guides 156, 158 can operate as cushioning members. With reference to FIG. 8, each guide has a dovetail configuration in cross section. Although the right guide 158 is not visible in FIG. 8, it should be understood that the right guide has the same configuration as the left guide 156. The guides 156, 158 cooperate with a respective extension guide 70, 72 to inhibit movement of the panel 16 along the horizontal axis H. In the depicted embodiment each guide 156, 158 is received by a respective extension guide 70, 72. However, these components could be reconfigured so the each extension guide is received by a respective extension (e.g., the inverse of that shown in FIG. 8).

As mentioned above, the clay model support device 10 includes the panel actuator assembly for driving the panel 16 with respect to the support frame 14. The panel actuator assembly in the illustrated embodiment includes a hydraulic assembly that can be used to move the panel 16 with respect to the support frame 14. In the illustrated embodiment the panel actuator assembly includes a crank arm 170 and a handle 172 connected to the crank arm. The crank arm 170 can be operatively connected with a hydraulic pump 174 (depicted schematically in FIG. 7) that is in fluid communication with a first inlet/outlet line 176 and a second inlet/outlet line 178.

The first inlet/outlet line 176 connects with a first fitting 182 and the hydraulic pump 174. The second inlet/outlet line 178 connects with a second fitting 184 and the hydraulic pump 174. The first fitting 182 connects with a first supply/return line 186, which connects the first fitting 182 to the left inner hydraulic cylinder and rod assembly 64. A second supply/return line 188 branches from the first supply/return line 186 to connect the first fitting 182 to the right inner hydraulic cylinder and rod assembly 66. A third supply/return line 192 connects the second fitting 184 to the left outer hydraulic cylinder and rod assembly 54. A fourth supply/return line 194 branches from the third supply/return line 192 to connect the second fitting 184 to the right outer hydraulic cylinder and rod assembly 56.

Figure 9:
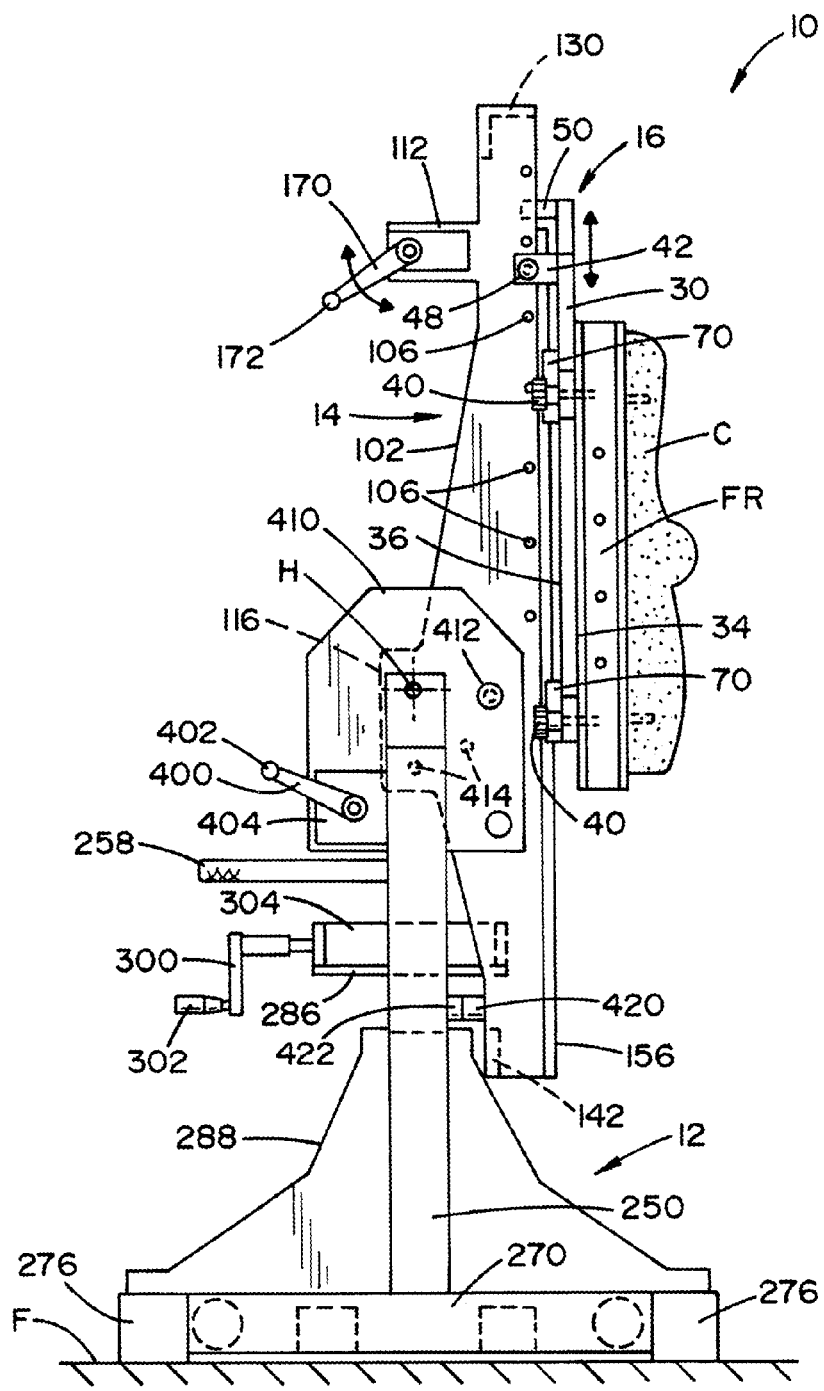
FIG. 9 is a side elevation view of the clay model support device and clay model depicted in FIG. 2 depicting the clay model moving vertically with respect to the support device.

With reference to FIGS. 7 and 9, rotation of the crank arm 170 using the handle 172, moves the panel 16 with respect to the support frame 14. For example, to move the panel 16 upwardly with respect to the support frame 14, an operator can rotate the crank arm 170 clockwise to operate the hydraulic pump 174 directing hydraulic fluid from a left inner cylinder 200 and a right inner cylinder 202 through the first supply/return line 186 and the second supply/return line 188 toward the first inlet/outlet line 176 and the pump 174. From the pump 174 fluid travels through the second inlet/outlet line 178 toward the left outer cylinder 204 and the right outer cylinder 206. This causes a left inner rod 208 and a right inner rod 212 to retract into the left inner cylinder 200 and right inner cylinder 202, respectively. This also causes in a left outer rod 214 and a right outer rod 216 to extend from the left outer cylinder 204 and the right outer cylinder 206, respectively to raise the panel 16 with respect to the support frame 14. As is evident from the schematic depiction shown in FIG. 7, rotation of the crank arm 170 in the opposite direction results in the lowering of the panel 16 with respect to the support frame 14. The hydraulic configuration depicted in FIG. 7 is merely schematic. Other hydraulic configurations can be employed. Moreover, the movement of the panel 16 with respect to the support frame 14 could also be performed via a mechanical transmission (e.g., a geared mechanism) or an electrical configuration (e.g., a configuration having an electrical motor).

The clay model support device 10 also includes a panel lock assembly for fixing the panel 16 with respect to the support frame 14. With reference to FIG. 8, the extension 42 that extends from the rear surface 36 of the panel body 30 includes the panel locking pin bore 46 receiving the panel locking pin 48. The panel locking pin 48 includes a threaded section 220 that threads into a threaded portion 222 of the panel locking pin bore 46. The panel locking pin 48 also includes an unthreaded section 224 extending from a distal end of the threaded section 220 and coaxial therewith. The unthreaded section 224 of the panel locking pin 48 is received inside a respective panel locking pin aperture 106 formed in the left rail 102 of the support frame 14 to fix the panel 16 with respect to the support frame 14. A similar locking assembly is located on the other (right) side of the panel 16 and the support frame 14. In lieu of a threaded connection, the panel locking pin 48 could be spring loaded and biased toward the support frame 14.

Figure 3:
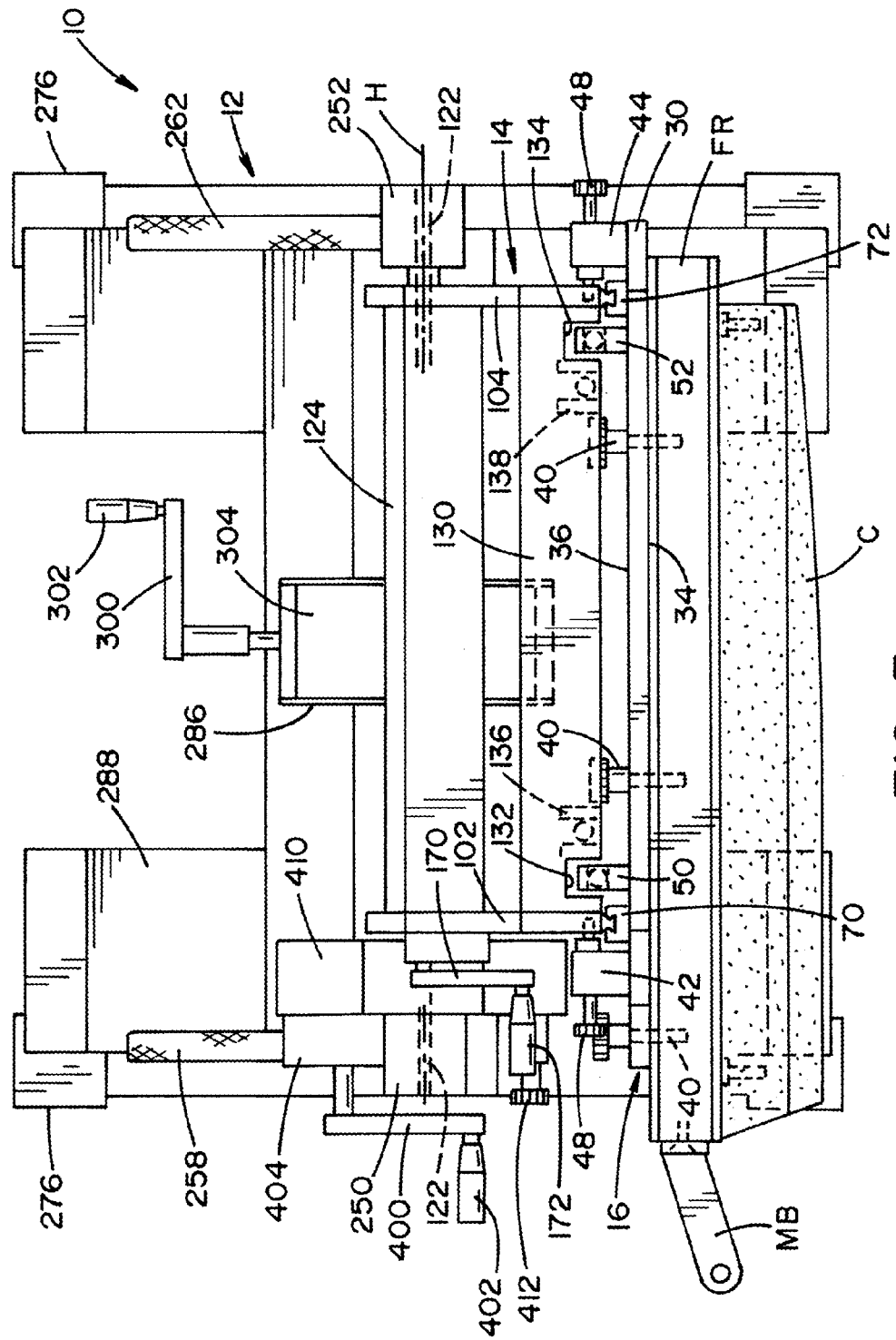
FIG. 3 is a top plan view of the clay model support device and clay model depicted in FIG. 2.
Figure 4:
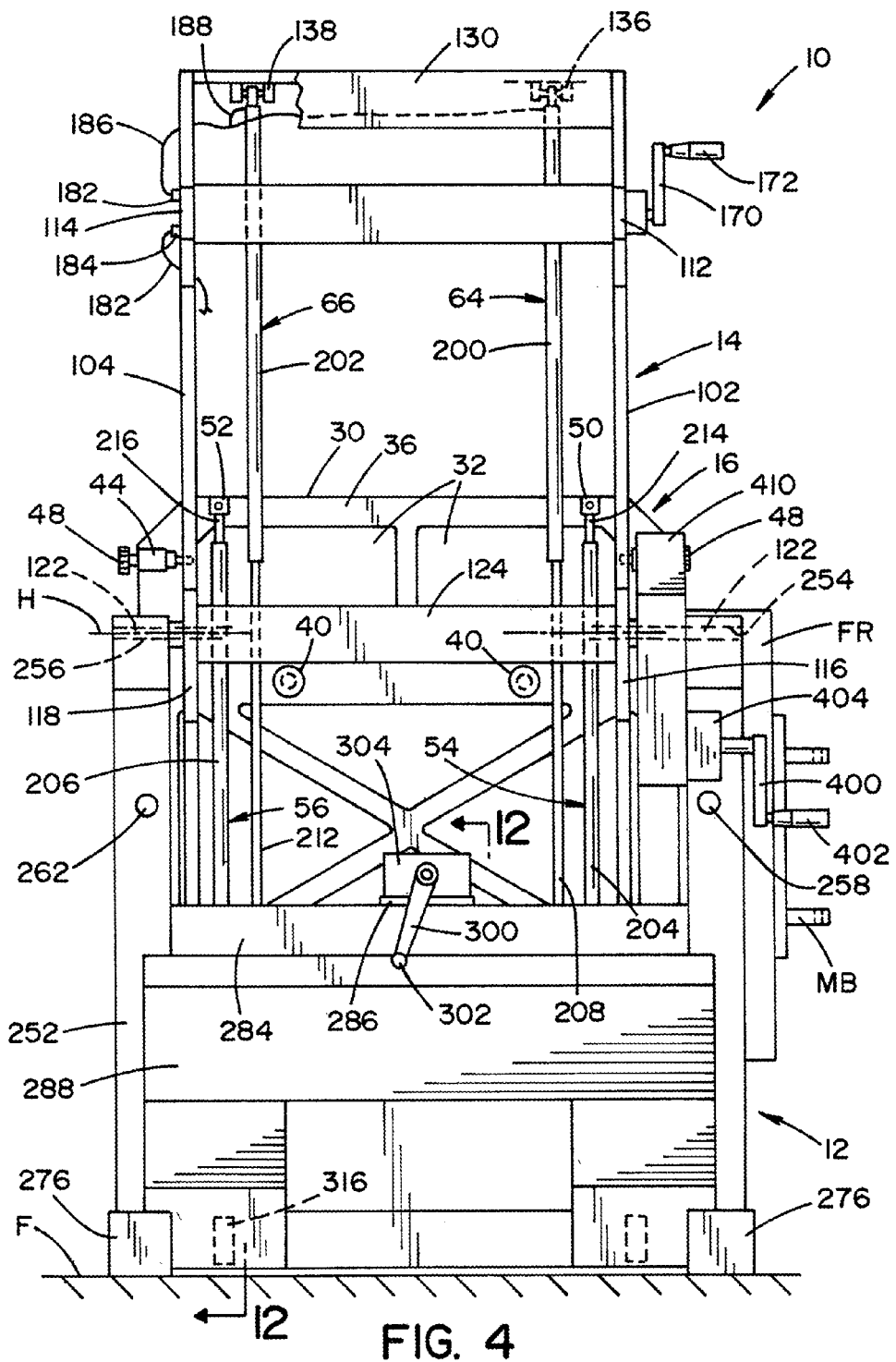
FIG. 4 is a rear elevation view of the clay model support device depicted in FIG. 1.

With reference back to FIG. 1, the base 12 includes a first (left) column 250 and second (right) column 252 (FIG. 3). The left column 250 includes a left axle opening 254 and the right column 252 includes a right axle opening 256 (FIG. 7). The axle openings 254, 256 receive the axle(s) to pivotally attach the support frame 14 to the base 12. Accordingly, in the depicted embodiment each axle opening 254, 256 can be at least about 800 mm from a lower surface of the base 12. The base 12 also includes a first (left) handlebar 258 connected with the left column 250 and a second (right) handlebar 262 connected to the right column 252. The handlebars 258, 262 allow an operator to maneuver the clay support device 10 in a manner that will be described in more detail below.

Figure 12:
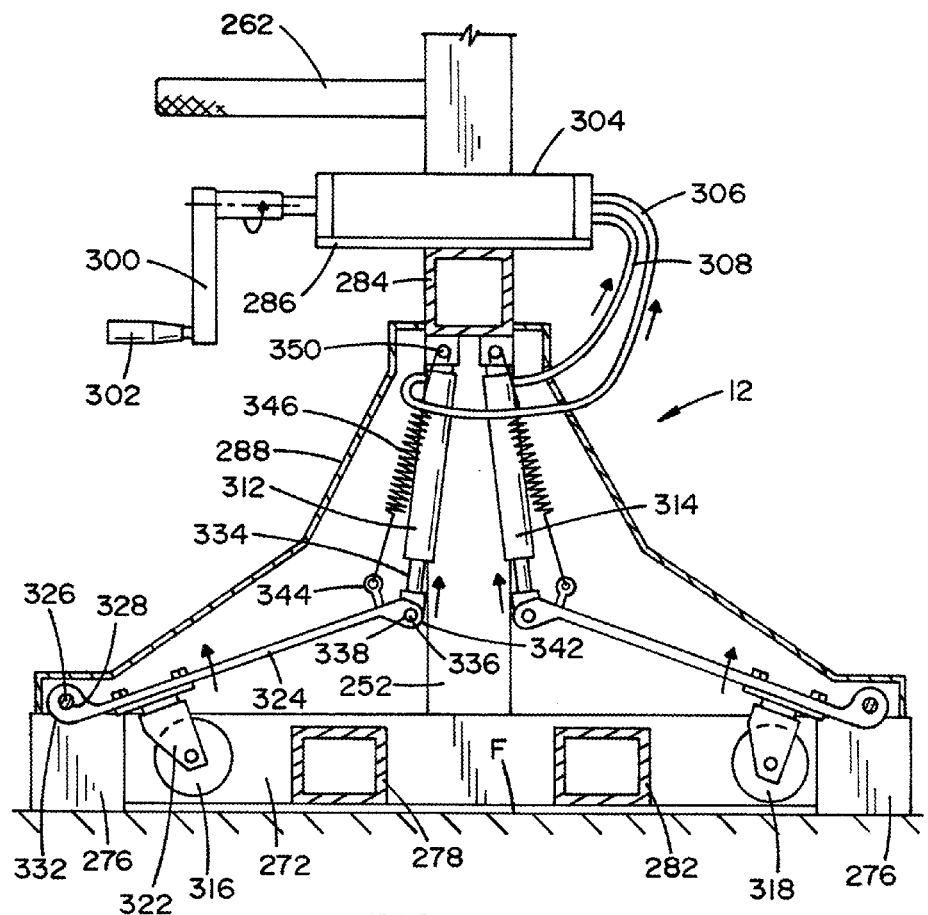
FIG. 12 is a cross-sectional view of the base of the clay model support device of FIG. 1 taken along line 12-12 in FIG. 4 showing wheels disengaged from a horizontal floor support surface.

The base 12 also includes horizontal lower support members 270, 272 (FIG. 12). The left column 250 extends upwardly from and generally perpendicular to the left horizontal lower support member 270. The right column 252 extends upwardly from and generally perpendicular to the right horizontal support member 272. The depicted device includes four feet 276 connected with the support members and configured to engage a horizontal floor surface F (see FIG. 12). The base 12 also includes lower cross members 278, 282 offset vertically above the lower surface of the feet 276. The lower cross members 278, 282 span between and connect with the horizontal lower support members 270, 272.

An upper cross member 284 spans between and connects with the left column 250 and the right column 252. A mounting plate 286 mounts to an upper surface of the upper cross member 284. A shroud 288 depends downwardly from the upper cross member 284 to cover components of a wheel actuator assembly. As seen in FIG. 12, the wheel actuator assembly includes a crank arm 300 and a handle 302 connected to the crank arm. The crank arm 300 extends from a housing 304 mounted on the mounting plate 286.

Figure 13:
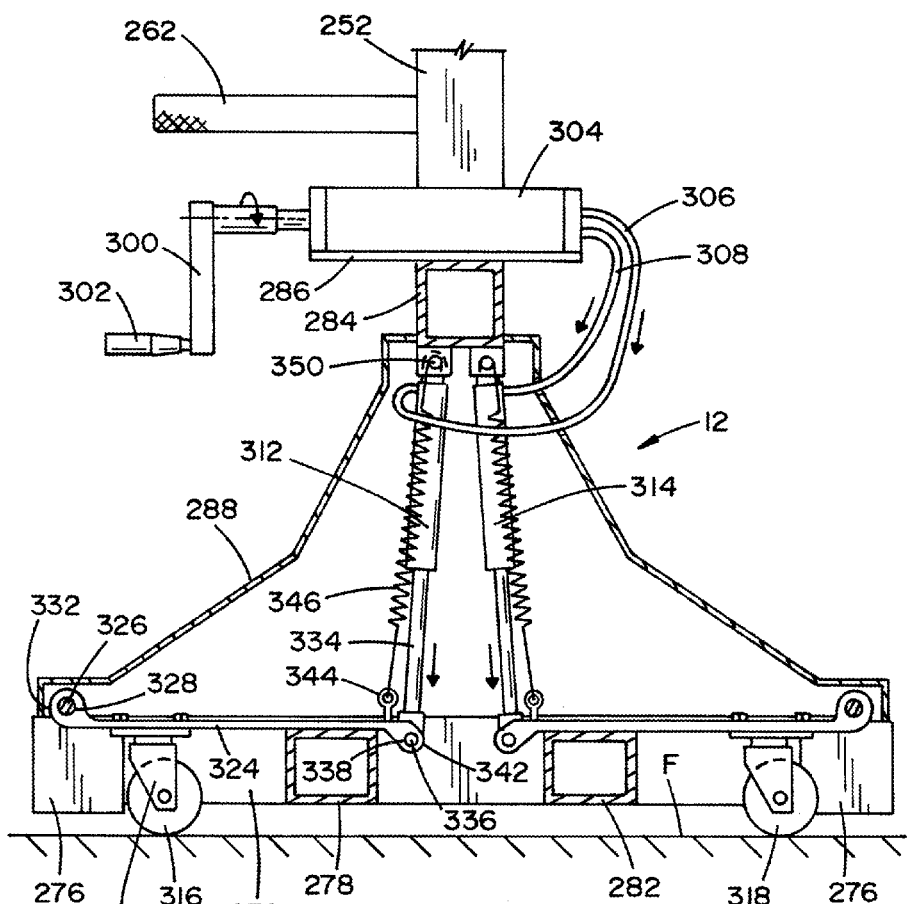
FIG. 13 is a side elevation view similar to FIG. 12 showing the wheels engaged the horizontal floor support surface.

The wheel actuator assembly includes a hydraulic device. The crank arm 300 can operate a hydraulic pump (not shown) similar to hydraulic pump 174 and located inside the housing 304 and connected with fluid lines 306 and 308, respectively. Each fluid line 306, 308 connects with a respective hydraulic cylinder 312, 314, respectively. Movement of the crank arm 300 results in movement of wheels 316, 318 in a manner that will be described in more detail below. Accordingly, the wheel actuator assembly drives the wheels 316, 318 between an operating position (FIG. 13) and a storage position (FIG. 12). With the wheels 316, 318 in the operating position, the handlebars 258, 262 can be used to maneuver the clay model support device.

The movement of the first wheel 316 is described below with the understanding that the movement of the second wheel 318 is similar. The wheel 316 connects to a caster wheel bracket 322 connected to a wheel support 324. The wheel support 324 is pivotally connected to the horizontal lower support members 270 and/or 272 via an axle 326 allowing the wheel support member 324 to pivot between a storage position (shown in FIG. 12) and an operating position (shown in FIG. 13). The wheel support 324 includes an opening 328 adjacent a first end 332 allowing the wheel support 324 to connect to the shroud 288 and/or the horizontal lower support members 270, 272. The wheel support 324 connects to a rod 334 via a pin 336. The pin 336 is received through an opening 338 formed in the wheel support 324 adjacent a second end 342.

The wheel support 324 also includes an eyelet 344 for attaching a tension spring 346 to the wheel support 324. The rod 334 extends from the hydraulic cylinder 312 connected with the first fluid line 306. To lower the wheel 316 to engage the horizontal floor surface F, an operator rotates the crank arm 300 to direct hydraulic fluid toward the cylinder 312 (see FIG. 13). This allows the wheel support 324 to pivot about the axle 326 and about the axle 336 for contact between the wheel 316 and the floor F. To retract the wheel 316 so that it no longer contacts the horizontal floor surface F, an operator rotates the crank arm 300 in the opposite direction which results in fluid leaving the cylinder 312 and the tension spring 346. The tension spring 346, which is attached to a pin 350 above the cylinder 312, pulls the eyelet 344 upwardly. This causes the wheel support 324 to pivot about the axle 326 and about the axle 336 so the wheel 316 no longer contacts the floor surface F. Accordingly, the base 12 (more particularly the feet 276 of base 12) rests on the floor surface F and the clay support device 10 is inhibited from moving.

Figure 10:
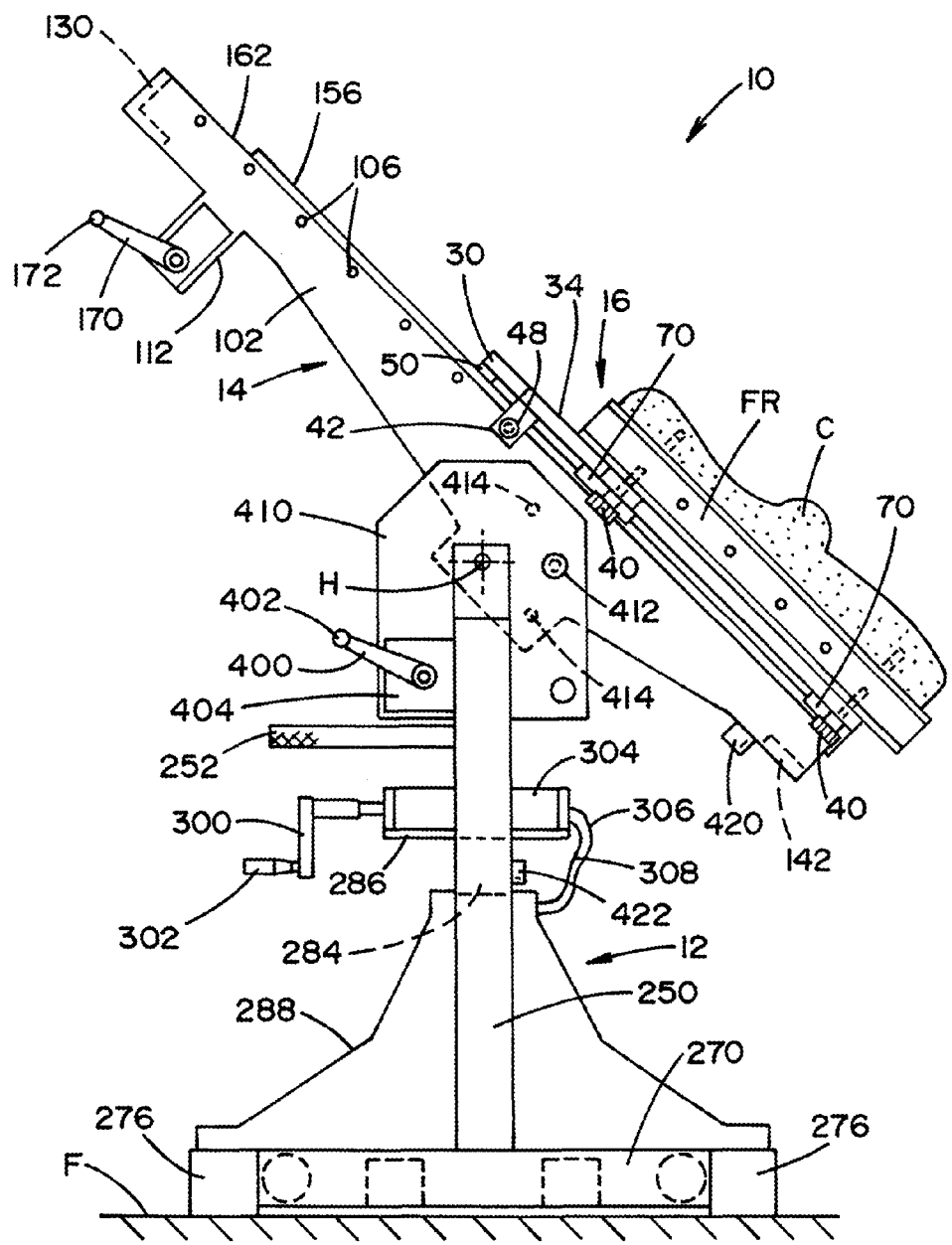
FIG. 10 is a side elevation view of the clay model support device and clay model depicted in FIG. 2 depicting a support frame of the clay model support device rotating with respect to a base of the clay model support device.
Figure 11:
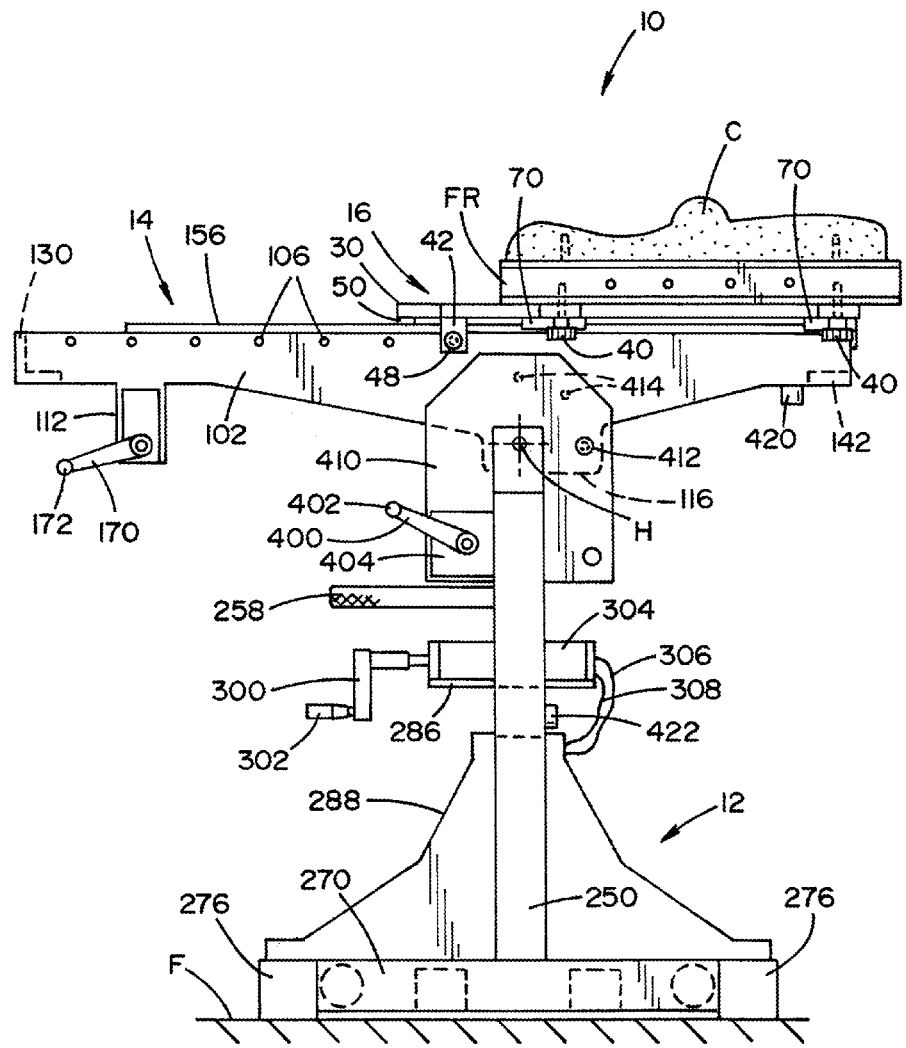
FIG. 11 is a side elevation view of the clay model support device and clay model depicted in FIG. 2 showing the support frame rotated with respect to the base.

The clay model support device 10 also includes the support frame actuator assembly connected with the base 12 and the support frame 14. The support frame actuator assembly is configured to drive the support frame 14 to pivot the support frame with respect to the base 12. The support frame actuator assembly includes a crank arm 400 and a handle 402 connected with the crank arm. The crank arm 400 extends from a housing 404 that houses a worm gear assembly (not shown). Referring to FIGS. 10 and 11, orbital movement of the handle 402, and the associated rotational movement of the crank arm 400, results in pivotal movement of the support 14 with respect to the base 12.

In the illustrated embodiment, a support frame locking plate 410 connects with the left column 250 of the base 12. A support frame locking pin 412 similar to the locking pin 48 can be selectively received in support frame locking pin holes 414 formed in the left rail 102 to fix the support frame 14 with respect to the base 12. In the depicted embodiment, the support frame includes a plurality of locking pin holes 414 each configured to selectively receive the support frame locking pin 412 to fix the support frame 14 with respect to the base 12. This provides an operator access to the lower surface of the clay model C supported by the device 10. In the illustrated embodiment, the support frame 14 is pivotable into at least two positions (and more particularly three positions are available). In a first position (see FIG. 1) the mounting surface 34 of the panel body 30 is substantially vertically oriented. In a second position (see FIG. 11) the panel mounting surface 34 of the panel body 30 is substantially horizontally oriented. In a third position (see FIG. 10) the panel mounting surface 34 of the panel body 30 is substantially diagonally oriented.

With reference to FIG. 9, the clay model support device 10 also includes a stopper 420 connected with the support frame 14. More particular to the depicted embodiment, the stopper 420 extends from a rear surface of the left rail 102 (another stopper can extend from the right rail 104). The clay model support device 10 also includes a bumper 422 connected with the base 12. In the depicted embodiment, the bumper 422 extends from a forward surface of the cross member 284. Another stopper could be provided. The stopper 420 can contact the bumper 422 when the support frame 14 is generally vertically oriented as shown in FIG. 9.

Figure 2:
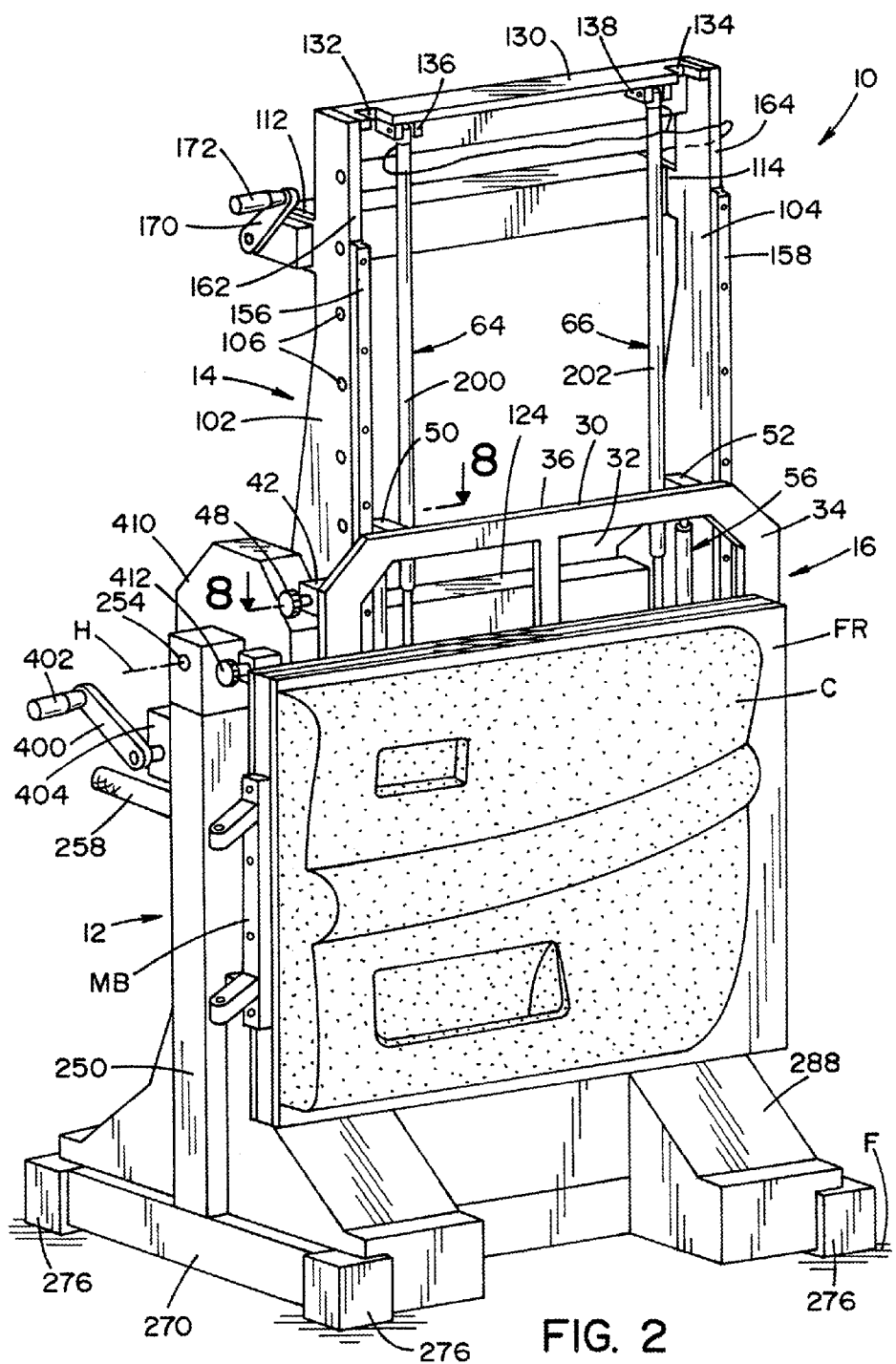
FIG. 2 is a front perspective view of the clay model support device having a clay model supported on the device.
Figure 5:
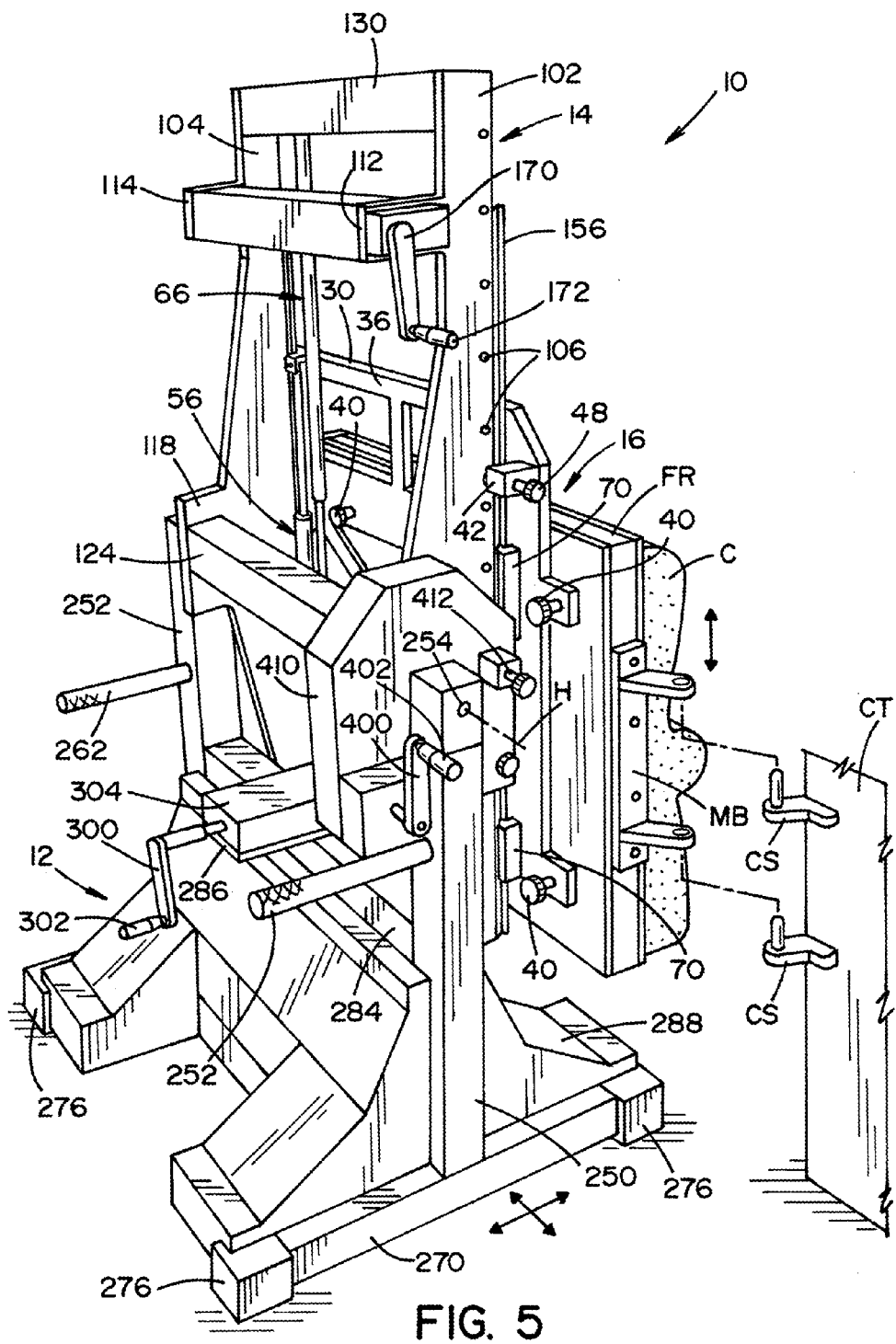
FIG. 5 is a rear perspective view of the clay model support device and the clay model depicted in FIG. 2 depicting the clay model being mounted to or dismounted from the clay model support device.
Figure 6:
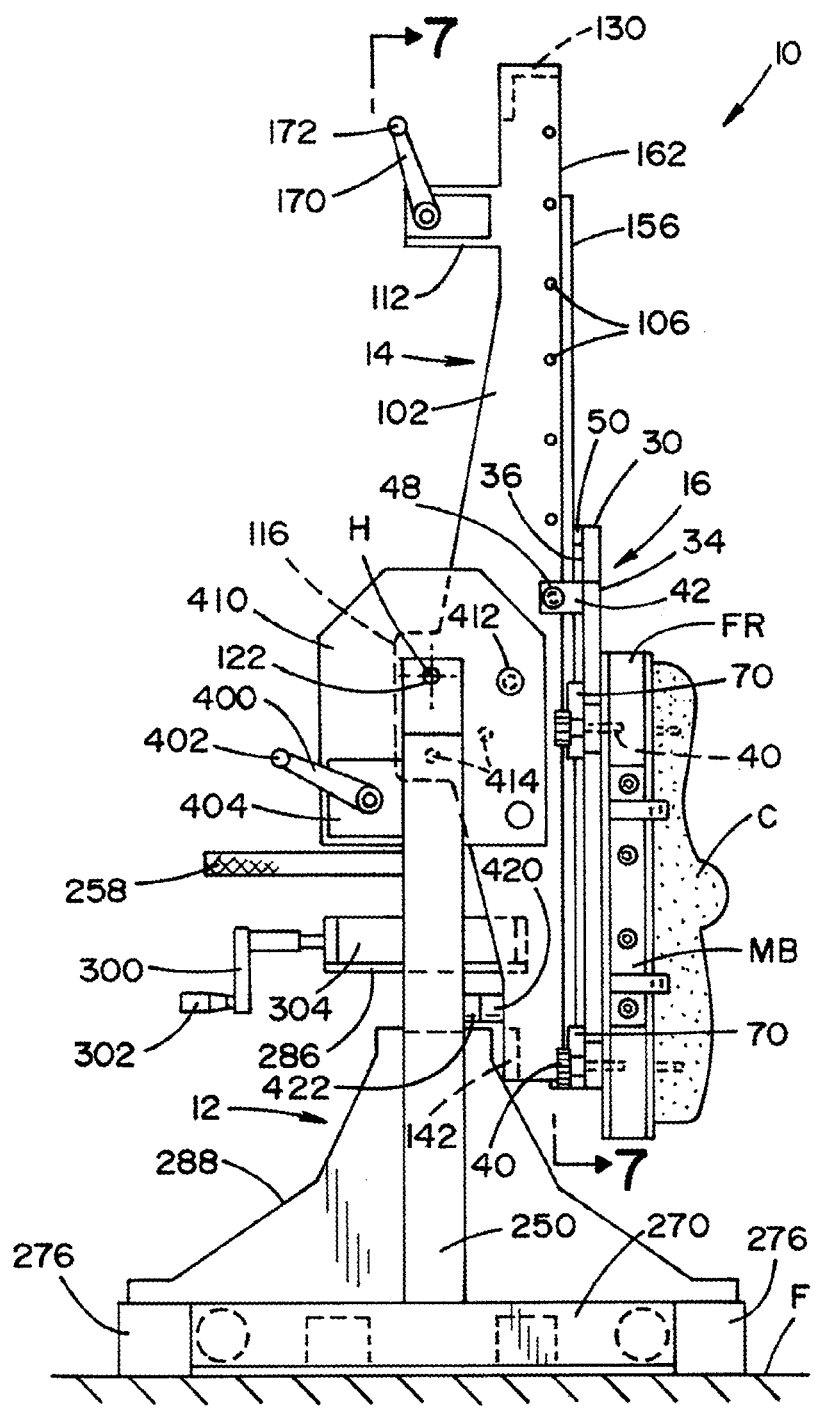
FIG. 6 is a side elevation view of the clay model support device and clay model depicted in FIG. 2.

FIG. 2 depicts the clay model C and the frame FR mounted to the clay model support device 10. A mounting bracket MB attaches to the frame FR, which allows the frame to be easily mounted to and dismounted from the clay model support device 10. By being able to adjust the panel 16 for translational movement (e.g., linear movement) and being able to pivot the support frame 14, the clay model C can be moved into a position for easy mounting and dismounting, thus allowing an operator to avoid heavy lifting situations. A portion of a cart CT is depicted in FIG. 5. The cart CT has catches CS that can engage the mounting bracket MB to facilitate mounting and dismounting the clay model C from the clay model support device 10.

A clay model support device has been described with particularity. Modifications and alterations will occur to those upon reading and understanding the preceding detailed description. The invention, however, is not limited to only those embodiments described above. Instead, the invention is defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A clay model support device comprising: a base having a lower surface configured to engage an associated horizontal floor surface; a support frame connected with the base, the support frame being pivotable with respect to the base about a generally horizontal axis, wherein the support frame includes an elongated rail having a plurality of panel locking pin holes located on the elongated rail and spaced in a direction parallel to a longest dimension of the rail; a panel configured to support an associated clay model, the panel being connected with the support frame such that the panel is slidable with respect to the support frame; a plurality of supports extending from a panel mounting surface and configured to engage an associated frame to which the associated clay model is attached; and a panel locking pin, wherein the panel includes a panel locking pin bore receiving the panel locking pin, wherein the panel locking pin holes on the elongated rail are configured to receive the panel locking pin to fix the panel with respect to the support frame.

2. The clay model support device of claim 1, wherein the plurality of supports are pins, and the pins in aggregate are configured to support an associated clay model at least about 40 kg in mass.

3. The clay model support device of claim 1, wherein the support frame is pivotable into at least two positions, in a first position the panel mounting surface is substantially vertically oriented and in a second position the panel mounting surface is substantially horizontally oriented.

4. The clay model support device of claim 3, wherein the generally horizontal axis about which the support frame is pivotable is located at least about 800 mm vertically above the lower surface of the base.

5. The clay model support device of claim 1, further comprising a panel actuator assembly for slidably driving the panel with respect to the support frame.

6. The clay model support device of claim 5, wherein the panel actuator assembly includes a hydraulic cylinder and rod assembly connected with the panel and the support frame and a hydraulic pump in fluid communication with the hydraulic cylinder and rod assembly.

7. The clay model support device of claim 1, further comprising a support frame actuator assembly connected with the base and the support frame, the support frame actuator assembly being configured to drive the support frame to pivot the support frame with respect to the base about the generally horizontal axis.

8. The clay model support device of claim 7, wherein the support frame actuator assembly includes a handle and a gear train operatively connected with the support frame, wherein orbital movement of the handle results in pivotal movement of the support frame.

9. The clay model support device of claim 7, further comprising a support frame locking pin connected with the base, wherein the support frame includes a plurality of support frame locking pin holes each configured to selectively receive the support frame locking pin to fix the support frame with respect to the base.

10. The clay model support device of claim 1, wherein the base includes a first column, a second column, and a lower support member, wherein the first column is spaced horizontally from the second column and each column connects with the lower support member, wherein the lower surface of the base is on the lower support member, each column includes an axle opening spaced at least about 800 mm vertically above the lower surface of the base.

11. The clay model support device of claim 1, further comprising wheels connected with the base, the wheels being movable vertically relative to the base.

12. A clay model support device comprising: a base having a lower surface configured to engage an associated horizontal floor surface; a support frame connected with the base, the support frame being pivotable with respect to the base about a generally horizontal axis; a panel configured to support an associated clay model, the panel being connected with the support frame such that the panel is slidable with respect to the support frame; a plurality of supports extending from a panel mounting surface and configured to engage an associated frame to which the associated clay model is attached; and wheels connected with the base, the wheels being movable vertically relative to the base.

13. The clay model support device of claim 12, further comprising wheel supports pivotally mounted to the base for rotation about a generally horizontal axis and a wheel actuator assembly for driving the wheels between an operating position and a storage position, wherein a respective wheel is connected to a respective wheel support.

14. The clay model support device of claim 13, wherein the wheel actuator assembly includes a hydraulic device.

15. The clay model support device of claim 12, wherein the support frame includes an elongated rail having a plurality of panel locking pin holes located on the elongated rail and spaced in a direction parallel to a longest dimension of the rail.

16. The clay model support device of claim 15, further comprising a panel locking pin, wherein the panel includes a panel locking pin bore receiving the panel locking pin, wherein the panel locking pin holes on the elongated rail are configured to receive the panel locking pin to fix the panel with respect to the support frame.

17. The clay model support device of claim 12, wherein the support frame includes an elongated rail and a guide connected with the rail and disposed between the rail and the panel.

18. The clay model support device of claim 17, further comprising a guide extension extending from a rear surface of the panel configured to cooperate with the guide to inhibit movement of the panel along the horizontal axis, the guide extension receiving the guide.

* * * * *